United States Patent [19]

Sasaki et al.

[11] Patent Number: 5,378,247
[45] Date of Patent: Jan. 3, 1995

[54] SEPARATORS AND METHOD OF MANUFACTURING THE SAME

[75] Inventors: Masakuni Sasaki, Tokyo; Yasushi Shimizu, Kanagawa; Teruo Yamaguchi, Kanagawa; Kiyotaka Tanaka, Kanagawa, all of Japan

[73] Assignee: Kabushiki Kaisha Toshiba, Kanagawa, Japan

[21] Appl. No.: 828,939

[22] Filed: Feb. 5, 1992

[30] Foreign Application Priority Data

Jul. 24, 1990 [JP] Japan .................................. 2-198241

[51] Int. Cl.⁶ .................................................. H01M 6/00
[52] U.S. Cl. ................................... 29/623.1; 29/623.3; 29/623.4
[58] Field of Search ................ 29/623.3, 623.4, 623.5, 29/623.2, 623.1

[56] References Cited

U.S. PATENT DOCUMENTS

| | | |
|---|---|---|
| 4,271,245 | 6/1981 | Suzuki et al. ................ 429/243 |
| 4,514,475 | 4/1985 | Mientek . |
| 4,920,019 | 4/1990 | Stoklosa et al. ................ 429/122 |
| 5,064,583 | 11/1991 | Dagostino et al. . |

FOREIGN PATENT DOCUMENTS

| | | |
|---|---|---|
| 61-92840 | 5/1986 | Japan . |
| 61-216257 | 9/1986 | Japan . |
| 63-53857 | 3/1988 | Japan . |
| 63-53858 | 3/1988 | Japan . |
| 63-241870 | 10/1988 | Japan . |
| 01084578 | 3/1989 | Japan . |
| 1-93062 | 4/1989 | Japan . |
| 01140559 | 6/1989 | Japan . |
| 1-211864 | 8/1989 | Japan . |
| 01211862 | 8/1989 | Japan . |
| 02090470 | 3/1990 | Japan . |
| 02168563 | 6/1990 | Japan . |
| 3-35658 | 4/1991 | Japan . |
| 8902251 | 4/1990 | Netherlands . |

Primary Examiner—Olik Chaudhuri
Assistant Examiner—C. Everhart
Attorney, Agent, or Firm—Finnegan, Henderson, Farabow, Garrett & Dunner

[57] ABSTRACT

A method of manufacturing a separator for forming a current collector and edge plate by placing a die and an outer frame for surrounding the die on a press head, placing a thin material plate and a soft plate, and pressing the thin material plate through the soft plate. When the current collector and the edge plate are made press working, cut working and joint working such as welding, can be omitted. Accordingly, the residual stress which is intrinsic to such workings is prevented. Thus, no stress is released by the temperature rise involved in the fuel cell operation and the members of the fuel cell do not become distorted. Additionally, the method provides high productivity.

5 Claims, 15 Drawing Sheets

SEPARATORS AND METHOD OF MANUFACTURING THE SAME

TECHNICAL FIELD

The present invention relates to a fuel cell, particularly to a separator for leading fuel gas and air respectively to a fuel electrode and an air electrode of a molten carbonate fuel cell, which holds high operating temperature and has high efficiency, and for supporting an active component thereof.

RELATED ART

Fuel cells are means for directly providing electricity by using electrochemical reactions which take place on electrodes. To continuously perform such an electrochemical reaction, a fuel gas and an oxidant gas have to be separately and respectively supplied to a fuel electrode and an air electrode, these electrodes facing each other with an electrolyte layer.

A functional member for use in accomplishing such an object is a separator. When a fuel cell is constructed by laminating a plurality of active components comprising the fuel electrode, the electrolyte layer, and the air electrode, the separators are disposed between the active components so as to separately lead the fuel gas and air as the oxidant gas respectively to the fuel electrode and the air electrode. In addition, the separators support the active components which are laminated and electrically connect in series the active components which are adjacently disposed.

FIGS. 25 and 26 show an example of a fuel cell where active components are laminated. The fuel cells can be roughly categorized by the directions of flows of the fuel gas and the oxidant gas as (1) parallel flow type where the fuel gas and the oxidant gas are flowed in the same direction, (2) opposed flow type where the fuel gas and the oxidant gas are flowed in the opposed directions to each other, and (3) perpendicular flow type where the fuel gas and the oxidant gas are flowed in the perpendicular directions to each other. The construction of each member for use in the parallel flow the is the same as that in the opposed flow type.

An active component 1 is a laminate which is mainly composed of a electrolyte layer 2, an anode 3 contacted intimately on one surface thereof, and a cathode 4 contacted intimately on the other surface thereof. A separator 5 is contacted intimately on the active component 1. The fuel cell is constructed by alternately laminating the active components 1.

The separator 5 is composed of an interconnector 6, an anode current collector 7, a cathode current collector 8, an anode current collector support 9, a cathode current collector support 10, an anode edge plate 11, and a cathode edge plate 12.

The interconnector 6 is constructed in a plate shape and disposed nearly at the center of the thickness of the separator 5. The interconnector 6 separates the flow of the fuel gas 13 from that of the oxidant gas 14.

In addition, the anode current collector 7 and the cathode current collector 8 are also constructed in plate shapes. The anode current collector 7 and the cathode current collector 8 have large numbers of small holes 7a and 7b, respectively. The anode current collector 7 and the cathode current collector 8, which are disposed on both the sides of the interconnector 6, equally conduct the electricity which takes place at the active component 1 to the outside thereof. In addition, the anode current collector 7 and the cathode current collector 8 also support the full surface of the active component 1 with equal surface pressures.

The anode current collector support 9, which is in a corrugated plate shape, is disposed between the anode current collector 7 and the interconnector 6. In addition, the cathode current collector support 10, which is in a corrugated plate shape, is disposed between the cathode current collector 8 and the interconnector 6. Moreover, the anode edge plate 11 and the cathode edge plate 12 are disposed between the interconnector 6 and the active component 1 so as to support the edge portion of the interconnector 6. The anode current collector support 9, the cathode current collector support 10, the anode edge plate 11, and the cathode edge plate 12 produce spaces between the interconnector 6 and the anode current collector 7 and between the interconnector 6 and the cathode current collector 8 so as to flow the fuel gas 13 and the oxidant gas 14, respectively.

Since the anode current collector 7, the cathode current collector 8, the anode current collector support 9, the cathode current collector support 10, and the interconnector 6 electrically connect each of the adjacent active components 1 in series, they have to be made of metals. Thus, conventionally, the whole separator 5 is constructed of a metal so as to readily connect and assemble each member and to decrease the difference of thermal expansion thereof.

To decrease the electric resistance of the separator 5, thin plates are used for the anode current collector 7, the cathode current collector 8, and the interconnector 6. In addition, from the standpoint of productivity, the anode current collector support 9 and the cathode current collector support 10 are conventionally formed by using thin plates.

Generally, the separators 5 and the active components 1 thus constructed are alternately laminated one after the other so as to construct the cell. The cell is used as a fuel cell for generating a large amount of electric power.

As was described above, one surface of the active component 1 is in contact with the anode current collector 7 and the anode edge plate 11, while the other surface thereof is in contact with the cathode current collector 8 and the cathode edge plate 12. In this construction, it is necessary to be careful of production errors of functional elements, in particular, dimensional errors in the direction of thickness thereof.

In other words, as shown in FIG. 27, when the heights of the cathode current collector 8, the cathode current collector support 10, and the cathode edge plate 12 are denoted as a, b, and c, respectively, the individual accuracies thereof should be kept high so that the relation of $a+b=c$ is satisfied. However, an error for a tolerance takes place between the dimension of $a+b$ and that of c. Thus, it is very difficult to remove the gap between them. For example, although the inter-connector 6 and the cathode edge plate 12 are jointed by a braze working, it is difficult to control the thickness of the brazing material. Thus, the tolerance tends to become large to some extent. The same situation takes place with respect to the anode current collector 7, the anode current collector support 9, and the anode edge plate 11.

Generally, the fuel cell, which is constructed by laminating the active components 1 and the separators 5 one after the other for predetermined times, is operated with a constant surface pressure affected on each active component 1. Thus, when difference between the current collector level and the edge plate level becomes large, a large stress locally takes place and thereby the active component 1 may crack. In addition, when the anode 3 and the cathode 4 are not satisfactorily contacted with the anode current collector 7 and the cathode current collector 8, respectively, due to the gap of the contacted surface, the electric resistance thereof will increase, thereby loosing the electric output to some extent. Consequently, the performance of the fuel cell will be degraded. Moreover, when the anode 3 and the cathode 4 are not satisfactorily contacted with the anode edge plate 11 and the cathode edge plate 12, respectively, the fuel gas and the oxidant gas may leak.

Furthermore, in the above mentioned construction, the electric connections between the anode current collector 7 and the anode current collector support 9, between the cathode current collector 8 and the cathode current collector support 10, between the anode current collector 9 and the interconnector 6, and between the cathode current collector 10 and the interconnector 6 are made by contacts of the metal surfaces. Thus, when the contacted surfaces get corroded, the electric resistance thereof increases, thereby loosing the electric output.

Therefore, an object of the present invention is to provide a separator where there is no difference between the dimension of an current collector and that of an edge plate in the direction of the heights thereof.

Another object of the present invention is to provide a separator where the contacts of metal surfaces are decreased as small as possible, thereby preventing an electric output from being lost due to a corrosion of contacted surface.

A further object of the present invention is to provide a method of manufacturing a separator suitable for mass-production, the separator where a residual stress involved in a manufacturing thereof decreases, and residual stress is released by temperature rise involved in the operation of the fuel cell, thereby preventing the distortion of members.

DISCLOSURE OF THE INVENTION

The separator according to the present invention is a separator disposed between laminates of single cells having a fuel electrode, an electrolyte layer, and an air electrode for leading a fuel gas and an oxidant gas to the fuel electrode and the air electrode through different flow paths, respectively, wherein both of current collectors and edge plates in contact with the fuel electrode and the air electrode in the different flow paths and the periphery thereof are formed from thin plates to be flexible. Since the edge plate made of a thin plate can be readily bent in the direction where the active components are laminated, even if gaps between the current collector with the current collector support and the edge plate take place due to tolerance therebetween, either the current collector with the current collector support or the edge plate is bent and thereby the gaps are removed. Thus, the contacted surface with the active component can become flat, thereby preventing a force from being affected locally to the active component.

Another separator according to the present invention is a separator where an edge plate is formed from a thin plate to be flexible, the outer contours of the two edge plate being constructed nearly in the same shape, an outer contour of an interconnector being constructed in accordance with the outer contours of the edge plates, and a total of three plates consisting of the edge plates and the interconnector being laminated and integrated so as to keep the airtightness of the outer contour portion. As was described, the edge plate made of a thin plate to be flexible is equally contacted with the surface of the active component, thereby preventing a force from being affected locally thereto. In addition, since three plates of the interconnector and the edge plates which hold the interconnector therebetween are laminated and the outer contour portion thereof is constructed so as to be integrated and keep airtight, they can be readily and securely unified by a seal welding or the like.

The method of manufacturing a separator according to the present invention is a method of manufacturing a separator, the separator disposed between laminates of single cells having a fuel electrode, an electrolyte layer, and an air electrode for leading a fuel gas and an oxidant gas to the fuel electrode and the air electrode through different flow paths, respectively, for forming both of current collector and edge plates in contact with the fuel electrode and the air electrode and the periphery thereof, the method comprising the steps of placing a die and an outer frame for surrounding the die on a press head, placing a raw-material thin plate and a soft plate having a predetermined hardness on the die in the order, and pressing and forming the thin plate through the soft plate. When the current collector and the edge plate are made by using a press working, since a joint working by a cut working, a weld working, or the like becomes unnecessary, the residual stress which is caused by such a working can be removed. Thus, little residual stress can be released by the temperature rise involved in the operation of the fuel cell. Consequently, the distortion of the members can be prevented. In addition, high productivity can be accomplished.

BEST MODES FOR CARRYING OUT THE INVENTION

Now, the present invention will be described in details referring to the attached drawings.

Figure 1:
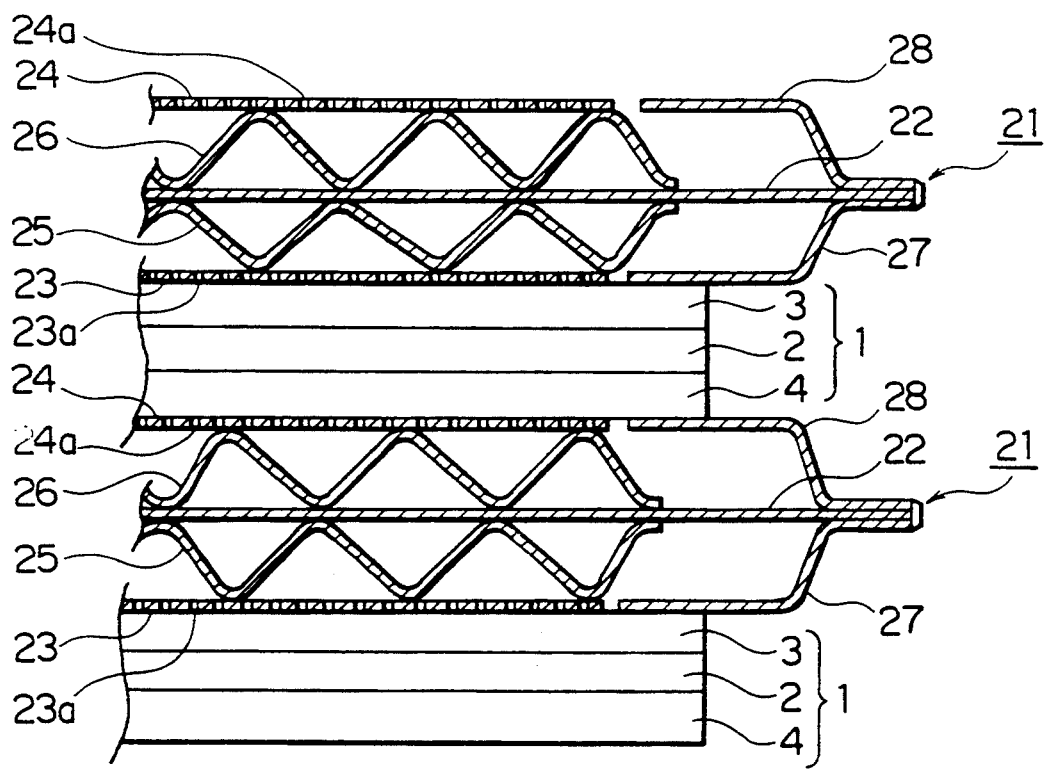
FIG. 1 is a view showing a construction of a separator according to an embodiment of the present invention.

FIG. 1 is a sectional view showing a construction of principal portions of a separator of an embodiment according to the present invention. In the figure, an active component 1 is the same as the laminate according to the related art. The active component 1 basically comprises an electrolyte layer 2, a fuel electrode (anode) contacted intimately on one surface thereof, and an air electrode (cathode) 4 contacted intimately on the other surface thereof. The active component 1 is adjoined to a separator 21. The active components 1 and the separators 21 are alternately laminated one after the other so as to constitute a fuel cell.

The separator 21 according to the present invention comprises an interconnector 22, an anode current collector 23, a cathode current collector 24, an anode current collector support 25, a cathode current collector support 26, an anode edge plate 27, and a cathode edge plate 28.

The interconnector 22 is constructed in a plate shape and disposed nearly at the center of the thickness of the separator 21. The interconnector 21 separates the flow of afuel gas from that of an oxidant gas.

In addition, the anode current collector 23 and the cathode current collector 24 are constructed in plate shapes. The anode current collector 23 and the cathode current collector 24 have large numbers of small holes 23a and 24a for passing the fuel gas and the oxidant gas to the anode 3 and the cathode 4, respectively. The anode current collector 23 and the cathode current collector 24 are disposed on both sides of the interconnector 22 so as to equally conduct the electricity which takes place in the active component 1 therefrom to the outside and to support the entire surfaces thereof with uniform surface pressures.

The anode edge plate 27 and the cathode edge plate 28 are made of thin plates so that they are elastically deformable in the vertical direction or the direction of the thickness thereof. In addition, the anode edge plate 27, the cathode edge plate 28, and the interconnector 22 are laminated thereof and welded along the periphery thereof. Thereby, they are kept airtight and unified.

Figure 2:
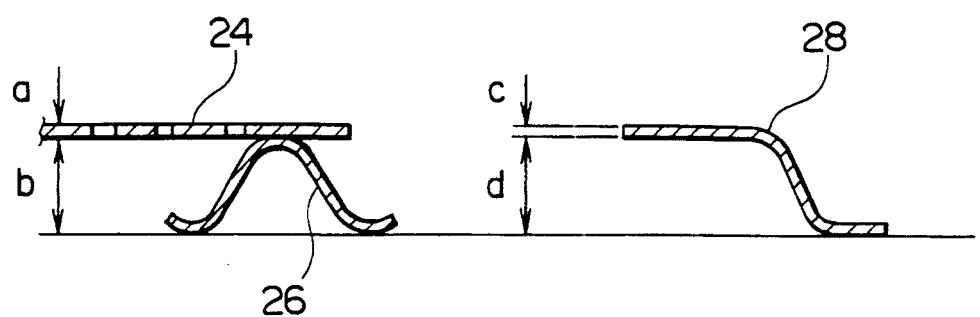
FIG. 2 is a view showing a production tolerance of the separator shown in FIG. 1.

The separator 21 is characterized in that both the anode edge plate 27 and the cathode edge plate 28 are made of thin plates and thereby they are rich with flexibility. However, even with the separator 21, as shown in FIG. 2, there are gaps equivalent to a production tolerance in the respective heights a and b of the cathode current collector 24 and the cathode current collector support 26 and the heights c and d of the cathode edge plate 28. After the fuel cell has been laminated and assembled, such gaps degrade the gas sealing property and increase the electric resistance thereof. In addition, the active component with a gap is concentratedly stressed and thereby the active component may crack and break. However, with respect to the separator 21 according to the present invention, both the cathode current collector support 26 and the cathode edge plate 28 are rich with flexibility. Even if a gap takes place to some extent in the production stage, since one of the members are bent, the surfaces of the cathode current collector 24 and the cathode edge plate 28 can be equally contacted with the active component 1, and a stress is not affected locally on the contacted surfaces thereof. This feature is also applied to the anode edge plate 27. In this case, to keep the gas sealing property high, it is preferable to consider the production tolerances so that the relation of $a+b<c+d$ is satisfied.

In addition, the separator 21 is characterized in that the peripheries of the interconnector 22, the anode edge plate 27, and the cathode edge plate 28 are jointed so as to prevent the fuel gas and the oxidant gas from leaking out of the separator. When the fuel gas and the oxidant gas leak out of the separator, they cause a combustion reaction and thereby the combustion heat raises the temperature of that portion. Thus, each member of the separator is acceleratedly degraded. However, with respect to the separator 21 according to the embodiment, since the three thin plates of the anode edge plate 27, the cathode edge plate 28, and the interconnector 22 are jointed, it is possible to prevent the fuel gas and the oxidant gas from leaking.

The interconnector 22, the anode edge plate 27, and the cathode edge plate 28 are welded along the peripheries (edges) thereof so as to reduce the thermal effect by the welding affected to curved portions of the anode edge plate 27 and the cathode edge plate 28. This prevents the above mentioned flexibility from being lost due to the thermal deformation.

With reference to the separator 21, the anode edge plate 27 and the cathode edge plate 28 can be readily made of thin plates by a press working. In addition, if the anode edge plate 27 and the cathode edge plate 28 are made by the press working, since a joint working by a cut working, weld working, and so forth becomes unnecessary, the residual stress involved in such a working can be removed. Thus, the release of the stress and deformation of members due to temperature rise involved in the operation of the fuel cell can be prevented.

Figure 3:
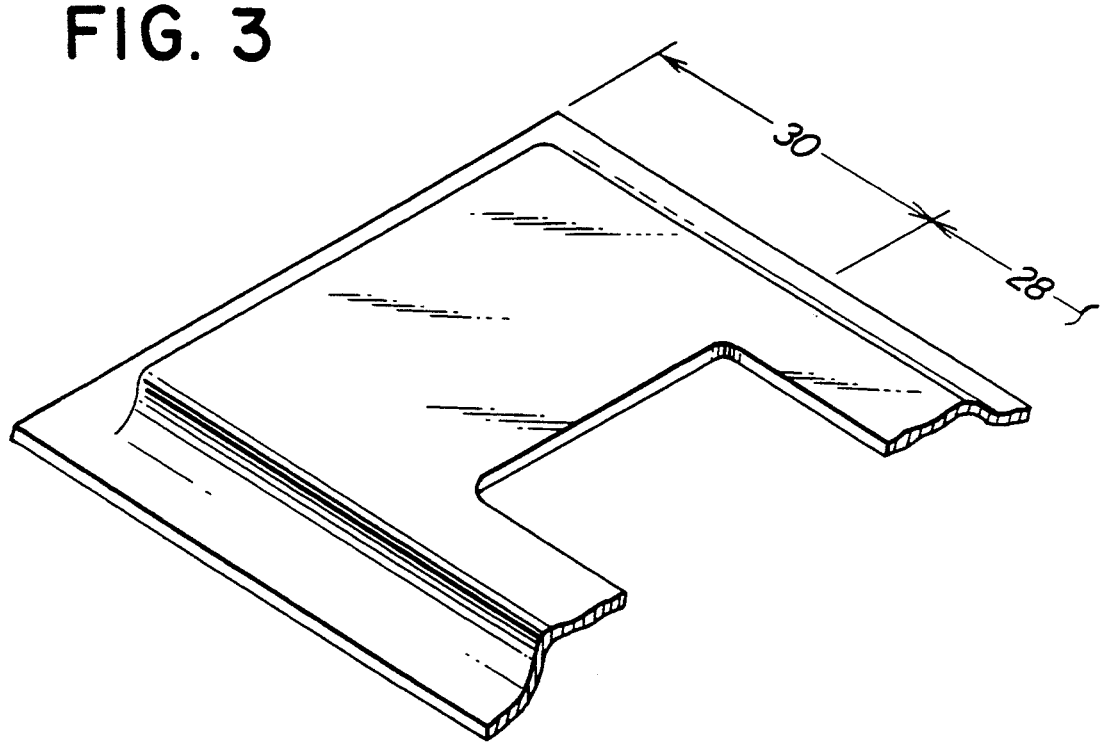
FIG. 3 is a view showing a construction of an edge plate made of a thin plate.

Conventionally, the separator is provided with a gas inlet and a gas outlet which are called manifolds. Edge plates which are disposed on the left and right sides of the gas flow (FIG. 1 shows the edge plate only on one side) are normally connected by the manifold portion. In the present embodiment, as shown in FIG. 3, the cathode edge plate 28 and the manifold portion 30 are unifiedly formed by the press working. Likewise, the anode edge plate 27 can be unifiedly formed.

At present time, it is estimated that the size of each side of the active component 1 of the fuel cell which will be commercialized will be in the range from 500 mm to 1000 mm. Thus, the size of the separator which leads the gases to the active component 1 will exceed the estimated size. In addition, from the standpoint of the strength, the life against corrosion, the weight reduction, and so forth, it is estimated that the thin plate which is used for the separator will be a stainless steel with a thickness in the range from 0.25 mm to 0.5 mm. To improve the dimensional accuracy of such a thin plate, in particular, the dimensional accuracy of the thickness thereof, the working method should be also considered.

Then, a press working method for the anode edge plate 27 and the cathode edge plate 28 according to the above mentioned embodiment will be described. For the press working, normally male and female type dies are used together. However, in the following embodiment, methods for using either male or female type die will be described.

Figure 4:
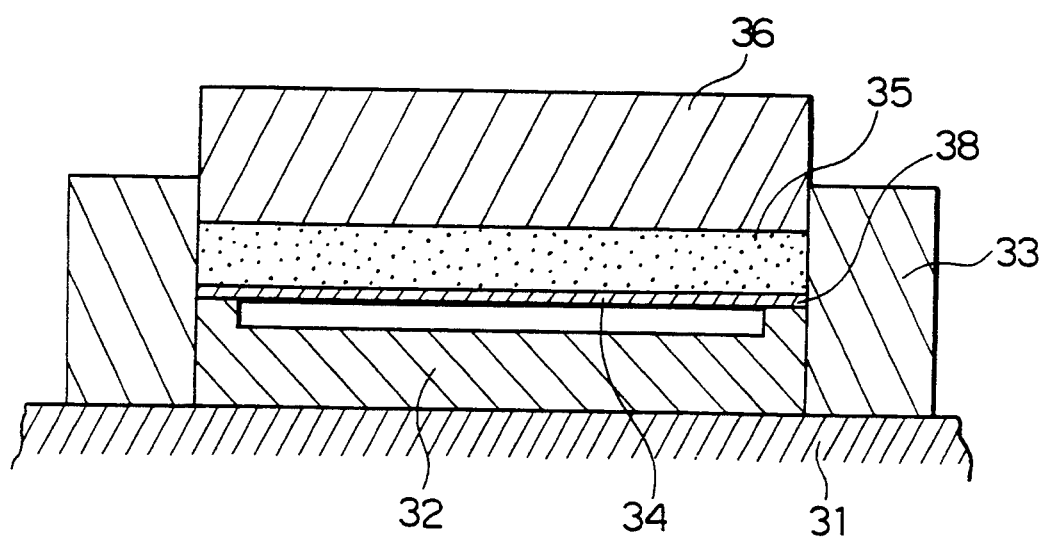
FIG. 4 is a view describing a production method by a press working.

With reference to FIG. 4, an example where a female type die is used will be described. First, a female type die 32 and an outer frame 33 which surrounds the female type die are set on a press head 31. Thereafter, a material 34 is placed on the female type die 32. In addition, a urethane rubber 35 with a particular hardness is placed on the material 34 as a medium for directly pressuring it. Thereafter, the urethane rubber 35 is pressured with a press ram 36, thereby transferring the pressure to the material 34 through the urethane rubber 35. The material 34 is drawn in accordance with a shape which is carved on the female type die 32. In other words, the urethane rubber 35 is deformed in accordance with the shape of the female type die 32. The outer frame 33 is used to confine the urethane rubber 35, which is plastically deformed, in the outer frame when the urethane rubber 35 is pressured and formed so as to prevent the urethane rubber 35 form extruding out of the outer frame and to reduce the pressure necessary for the forming.

Then, with reference to FIG. 5, an example where a male type die is used will be described. Like the example where the female type die 32 was used, a male type die 37 is placed on a press head 31 and then surrounded with an outer frame 33. Thereafter, a material 34 is placed on the male type die 37. Thereafter, a urethane rubber 35 with a particular hardness is placed on the material 34 as a medium for directly pressuring it. Thereafter, the urethane rubber 35 is pressured with the press ram 36 so as to transfer the pressure to the material 34 trough the urethane rubber 35. When the male type die 37 is used and the material 34 is pressured and formed, the urethane rubber 35 is drawn to a material edge portion 38 and thereby the portion 38 is deformed.

When the female type die 32 is compared with the male type die 37, the former is more suitable than the latter for forming the anode edge plate 27 and the cathode edge plate 28. When the male type die 37 is used, as shown in FIG. 5, the portion of the material 34 in contact with the male type die 37 is pressured and then the material 34 is deformed with an edge 39 of the extruded portion of the male type die. At this time, the portion of the material 34 which is not in contact with the male type die 37, namely the material edge portion 38, is not restrained. Thus, a wrinkle 40 as shown in FIG. 6 takes place.

On the other hand, when the female type die 32 is used, as shown in FIG. 4, since the outer contour portion (the material edge portion 38) of the material 34 which is in contact with the female type die 32 is first pressured, this portion is restrained and thereby Do wrinkle takes place. In contrast, when the material is formed, the inner edge thereof is not restrained. However, when the edge plate and the manifold portion 30 on both the sides are unifiedly formed as shown in FIG. 3, a wrinkle which tends to take place in the inner edge 41 of the material can be prevented as shown in FIG. 7.

The advantages for use of the female type die 32 are also valid when the separator is unified by a weld working (described later). Now, the effect of the female type die 32 will be described. In FIGS. 6 and 7, when the radius of curvature 43 of the edge portion 42 of the plate in the side closes to the material edge portion 38 are compared, the radius of curvature 43 in the case where the female type die 32 is used is smaller. Thus, when the outer contour portion 44 of the material is welded in assembling the separator, the deformation of the edge plate due to welding heat can be restrained with the angular portion 42 of the edge plate.

Figure 7:
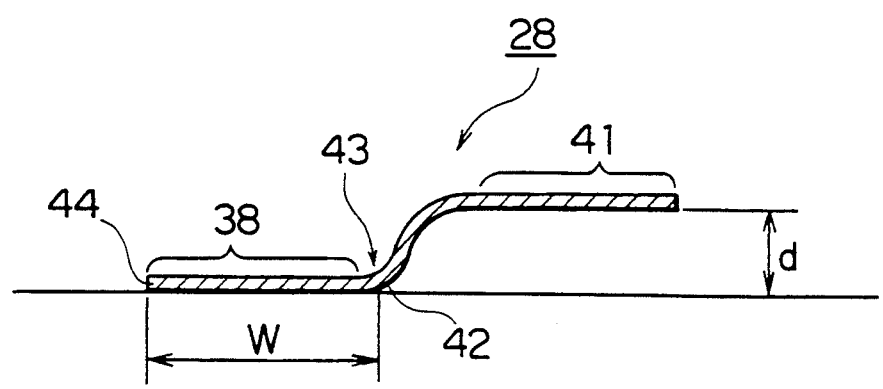
FIG. 7 is a view describing the workability of the press working.

Moreover, in the case where the edge plate is formed by using the female type die 32, when the width w of the material edge portion 38 is more than 5 times the height d of the edge plate as shown in FIG. 7, the material which is being formed can be restrained. In addition, the deformation of the material which is being welded can be prevented. Thus, the height and the flatness of the surface of the edge plate in contact with the active component (the upper surface of the inner edge portion 41 of the material) can become accurate.

When the above mentioned press working is performed, the material 34 is properly stretched. Thus, the bending intrinsic to the thin plate can be decreased and thereby the final dimensional accuracy can be improved. The surfaces of the anode edge plate 27 and the cathode edge plate 28 in contact with the active component 1 should have high flatness in assembling the stacking of the fuel cell. When the anode edge plate 27 and the cathode edge plate 28 are formed from thin plates, distortion thereof may be large. However, when they are formed in the above mentioned method, the distortion can be kept small.

Figure 8:
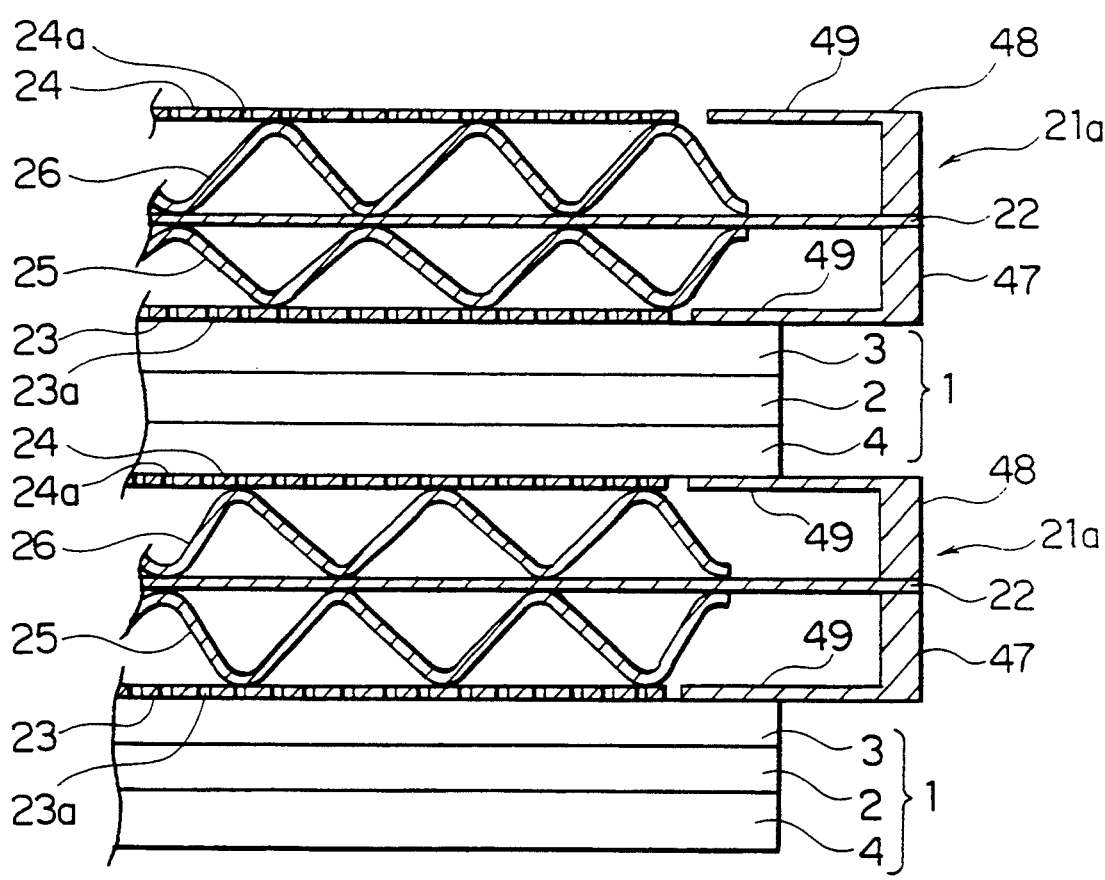
FIG. 8 is a view showing a construction of a separator according to another embodiment.
Figure 9:
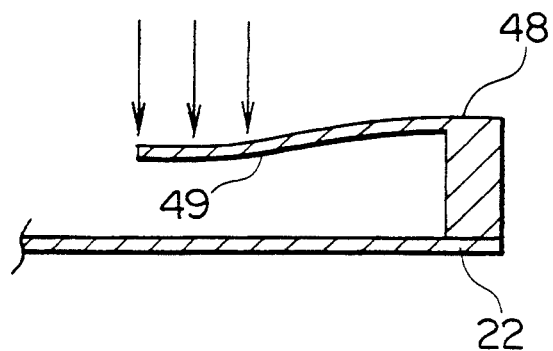
FIG. 9 is a view describing an operation of the separator shown in FIG. 8.

FIG. 8 shows a construction of a separator 21a of another embodiment. The separator 21a is provided with an anode edge plate 47 and a cathode edge plate 48 instead of the anode edge plate 27 and the cathode edge plate 28 according to the above mentioned embodiment. The anode edge plate 47 and the cathode edge plate 48 have thin plates 49 each of which has an elastically deformable portion which contacts the active component 1. As shown in FIG. 9, the thin plate 49 is bent against a pressure shown by the arrow. Thus, even with the anode edge plate 47 and the cathode edge plate 48, since the thin plate 49 with high flexibility is bent, a gap due to a production tolerance can be removed. Thus, in the similar manner to the mentioned embodiment the pair of the anode current collector 23, and the anode edge plate 47 and the pair of the cathode current collector 24 and the cathode edge plate 48 can be intimately contacted with the active component 1.

Figure 10:
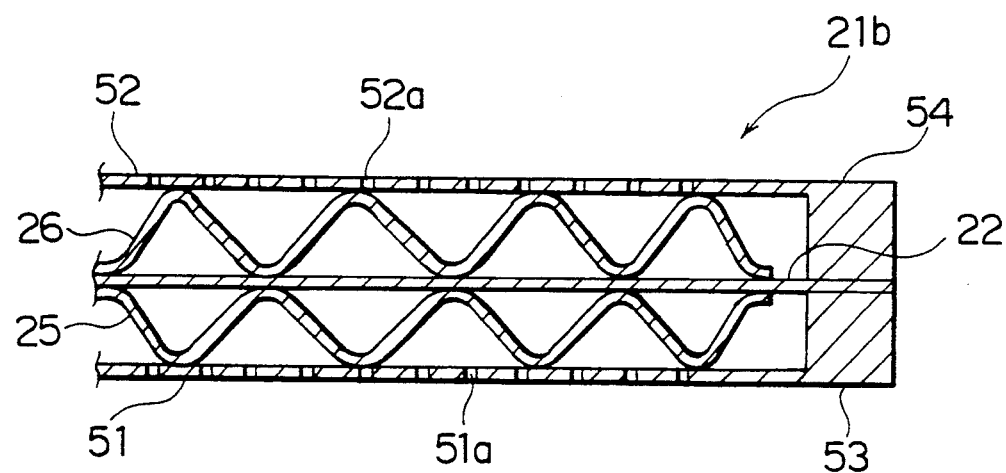
FIG. 10 is a view showing a construction of a separator of an embodiment where an edge plate and a current collector plate are unified.

FIG. 10 shows a construction of a separator 21b of another embodiment. The separator 21b is constructed such that an anode current collector 51 and an anode edge plate 53, and a cathode current collector 52 and a cathode edge plate 54 are continuous, respectively. The anode current collector 51 and the cathode current collector 52 have large numbers of small holes 51a and 52b for passing the fuel gas and the oxidant gas to the anode 3 and the cathode 4, respectively.

In the separator 21b thus constructed, the pair of the anode current collector 51 and the anode edge plate 53, and the pair of the cathode current collector 52 and the cathode edge plate 54 are continuous. Thus, even if the anode current collector 51 and the cathode current collector 52 are deformed in any shapes, the surfaces thereof in contact with the active component 1 are continuously curved and thereby no discontinuous surface is formed in any position.

In other words, when the anode current collector 51, the anode edge plate 53, the cathode current collector 52, and the cathode edge plate 54 are separately constructed, even if the surfaces thereof in contact with the active component 1 can be kept in the same level due to the flexibility of the constituent components, the bending angle of the edge portion of the current collector may differ from that of the edge portion of the edge plate. In this situation, a stress may take place locally in the active component 1. However, when the above mentioned members are unifiedly constructed in accordance with the present embodiment, it is possible to prevent such a stress from taking place.

Figure 11:
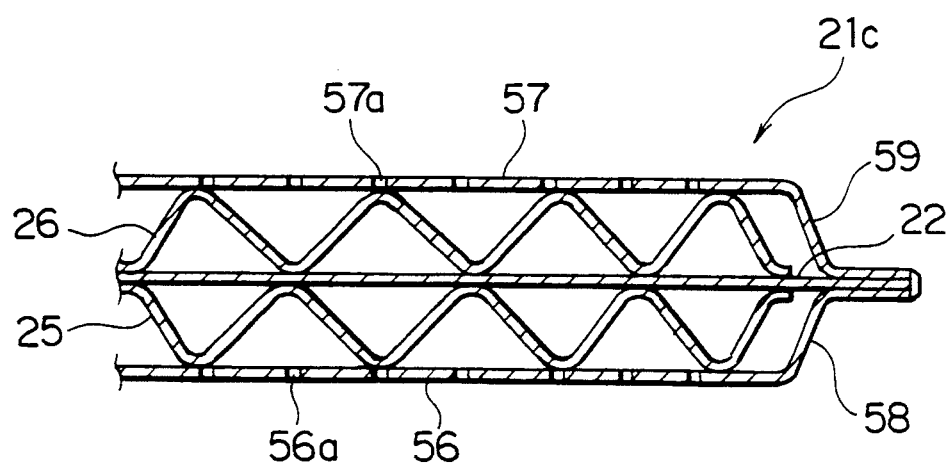
FIG. 11 is a view showing a construction of a separator according to another embodiment.
Figure 12A:
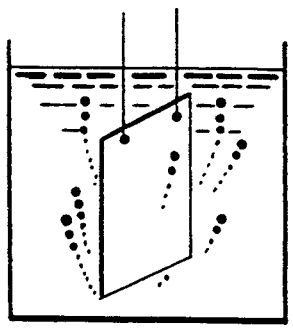
FIGS. 12(a)–12(f) show views describing an etching method.
Figure 12B:
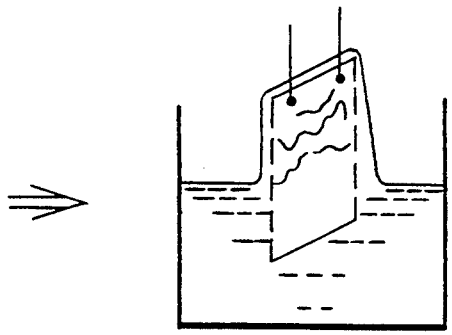
Figure 12C:
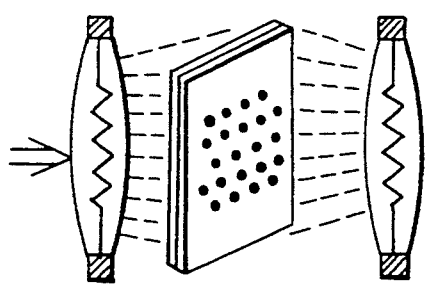
Figure 12D:
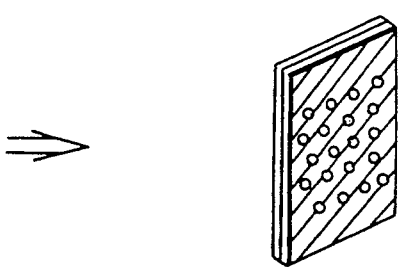
Figure 12E:
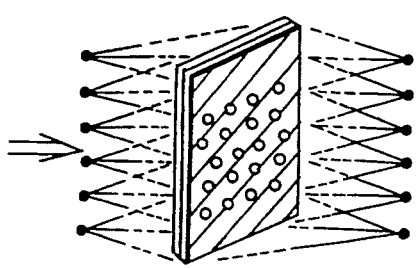
Figure 12F:
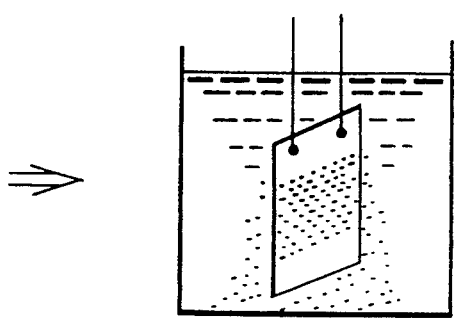

FIG. 11 shows a construction of a separator 21c of another embodiment. In this separator 21c, a pair of an anode current collector 56 and an anode edge plate 58 and a pair of a cathode current collector 57 and a cathode edge plate 59 are drawn from a single thin plate by a press work respectively so that they are integrated. The anode current collector 56 and the cathode current collector 57 have large numbers of small holes 56a and 57a for passing the fuel gas and the oxidant gas to the anode 3 and the cathode 4, respectively.

Like the above mentioned separator 21b, the separator 21c thus constructed can prevent a stress from taking place locally in the active component 1. In addition, the separator 21c does not require a cut working and a joint working by weld working, and so forth. Thus, the separator 21c can be readily produced. Moreover, it is possible to remove the residual stress which takes place in the members involved in such a working. Consequently, it is possible to prevent the members from being deformed by release of stress due to temperature rise involved in the operation of the fuel cell.

Figure 5:
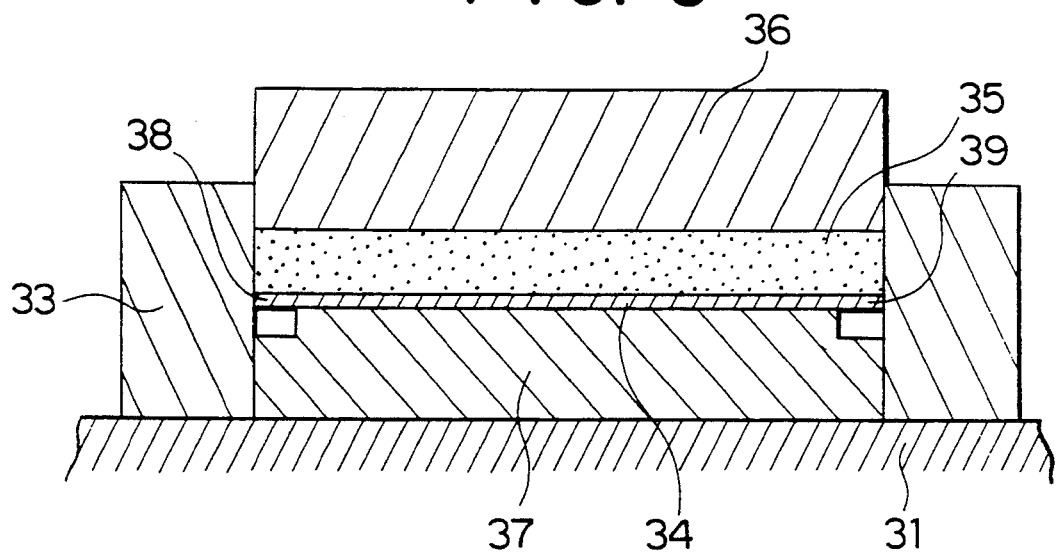
FIG. 5 is a view describing another production method by the press working.
Figure 6:
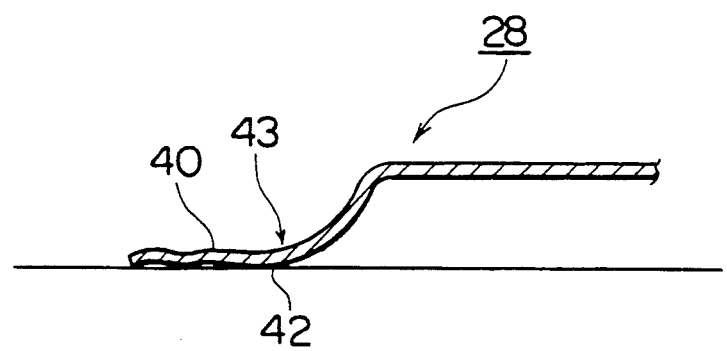
FIG. 6 is a view describing an occurrence of a wrinkle by the press working.

With respect to the press working method, the method using the female type die 32 shown in FIG. 4 and the method using the male type die 37 shown in FIG. 5 can be applied. Likewise, the working distortion in the case where the female type die 32 is used can be more suppressed than that in the case where the male type die 37 is used. In addition, since each edge plate and each current collector are formed from one plate, a winkle does not tend to take place. Thus, it is possible to decrease the electric contacting resistance between the anode current collector 56 and the active component 1 and between the cathode current collector 57 and the active component 1, thereby improving the output of electricity from the fuel cell.

Then, a method for forming large numbers of small holes 56a and 57a provided respectively on the anode current collector 56 and the cathode current collector 57 will be described.

The small holes 56a and 57a are used to pass the fuel gas and the oxidant gas to the active component 1. Conventionally, the small holes 56a and 57a are made by a machine working such as a punch working. However, when the material is machined, it is distorted. Since the separator is intimately contacted with the active component, a high surface accuracy is required. Thus, a working method which does not distort the material should be used. Thus, an etch working method for making the small holes 56a and 57a is used so as to decrease the number of machine working steps, thereby providing a separator with a high surface accuracy.

FIGS. 12(a)–12(f) show an example of the etch working method. In the etch working method shown in the figure, first a plate is washed (FIG. 12 A). Thereafter, a photosensitive agent is coated on the entire surfaces of the plate (FIG. 12 B).

Thereafter, the surfaces on which the photosensitive agent is coated are masked with masks having a particular small hole pattern. In this state, the surfaces are exposed (FIG. 12 C). The surfaces are developed so as to transfer the small hole patterns of the masks to the plate (FIG. 12 D).

Thereafter, the plate is etched so as to make small holes (FIG. 12 E). Last, the photosensitive agent is removed from the plate (FIG. 12 F).

With the above mentioned etch working, the material plate is corroded so as to make the small holes 56a and 57a. Thus, since the steps of shear working for the anode current collector 56 and the cathode current collector 57 can be omitted, the distortion of the members can be prevented. For example, when holes are made by a punch working, only the portions where the holes are made are stretched in the direction of the plate surface and thereby a distortion takes place at a boundary between the worked portions and the non-worked portions.

Figure 13:
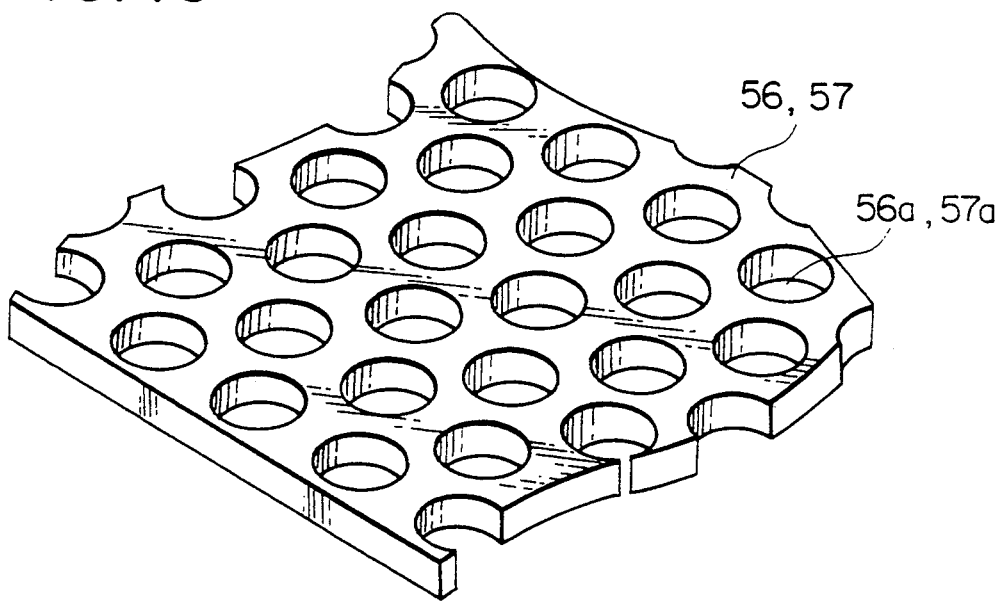
FIG. 13 is an enlarged view of a construction of a current collector where an etch working is performed.
Figure 14:
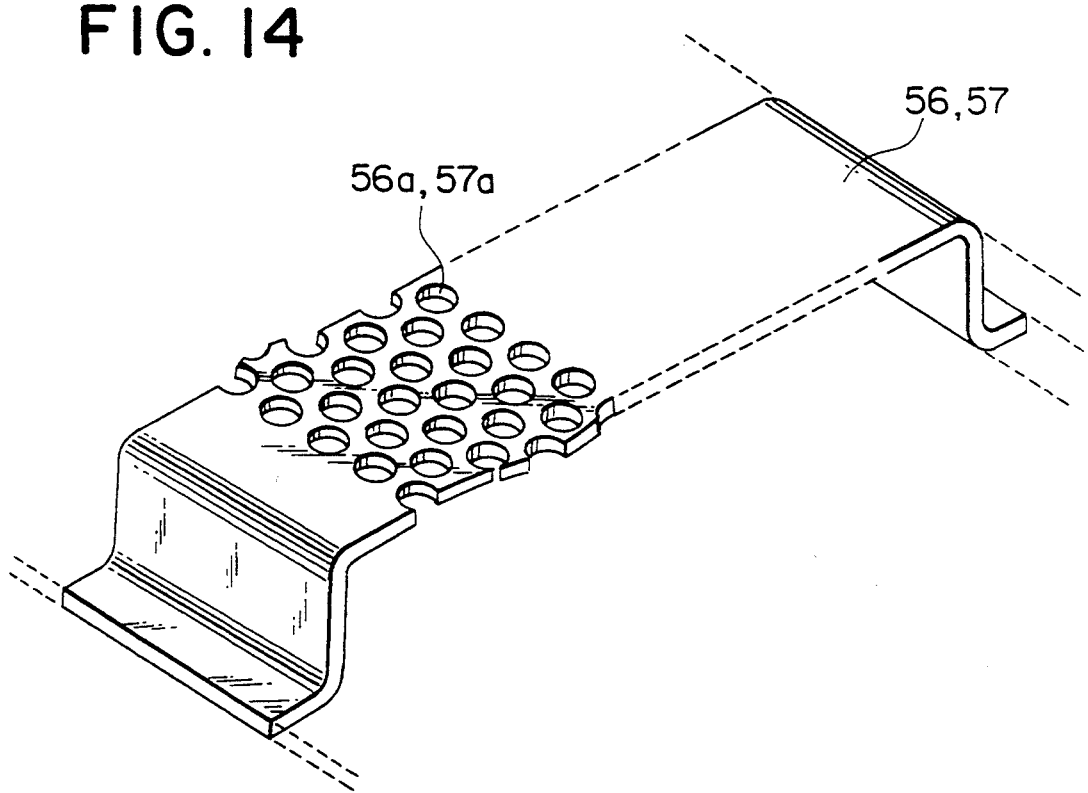
FIG. 14 is a view showing a construction of a current collector where the etch working is performed.

FIGS. 13 and 14 show an anode current collector 56 and a cathode current collector 57 which have been etched. In this embodiment, the small holes 56a and 57a are round. However, it is possible to make such holes in any shape in the same manner.

As a working for making holes, it is possible to use an electric discharge working which has the same effect as the etch working, the effect preventing the distortion of the members.

Figure 15:
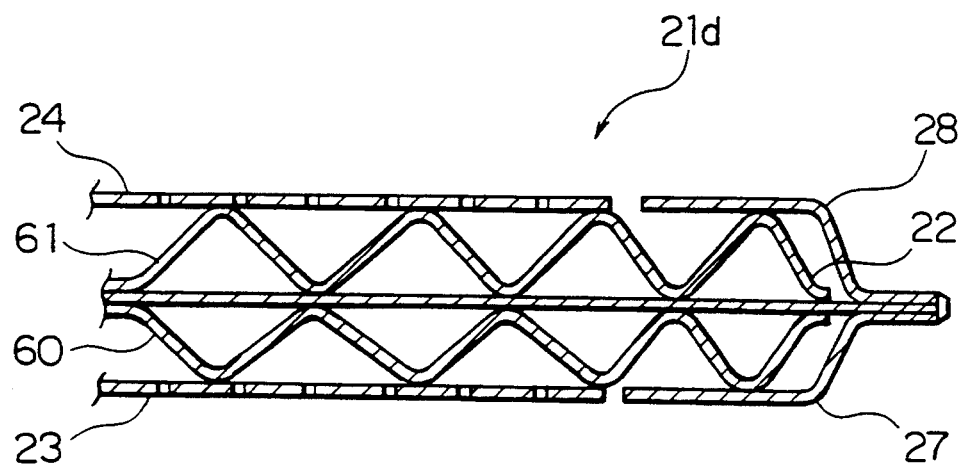
FIG. 15 is a view showing a construction of an embodiment where a current collector support is extended to the position of an edge plate.

Then, with reference to FIG. 15, a separator 21d of another embodiment will be described.

The separator 21d is characterized in an anode current collector support 60 and a cathode current collector support 61. In other words, the anode current collector support 60 is extended not only between the interconnector 22 and the anode current collector 23, but also between interconnector 22 and the anode edge plate 27. On the other hand, the cathode current collector support 61 is extended not only between the interconnector 22 and the cathode current collector 24, but also between the interconnector 22 and the cathode edge plate 28.

When the anode edge plate 27 and the cathode edge plate 28 of the separator 21d thus constructed are bent, the anode current collector support 60 and the cathode current collector support 61 support them so that the heights of the anode current collector 23 and the cathode current collector 24 becomes the same as those of the anode edge plate 27 and the cathode edge plate 28, respectively. In this case, the rigidities of the anode edge plate 27 and the cathode edge plate 28 are preferably smaller than those of the anode current collector support 60 and the cathode current collector support 61. The anode current collector support 60 and the cathode current collector support 61 can be also used when the anode edge plate 47 and the cathode edge plate 48 shown in FIG. 8 are used.

Figure 16:
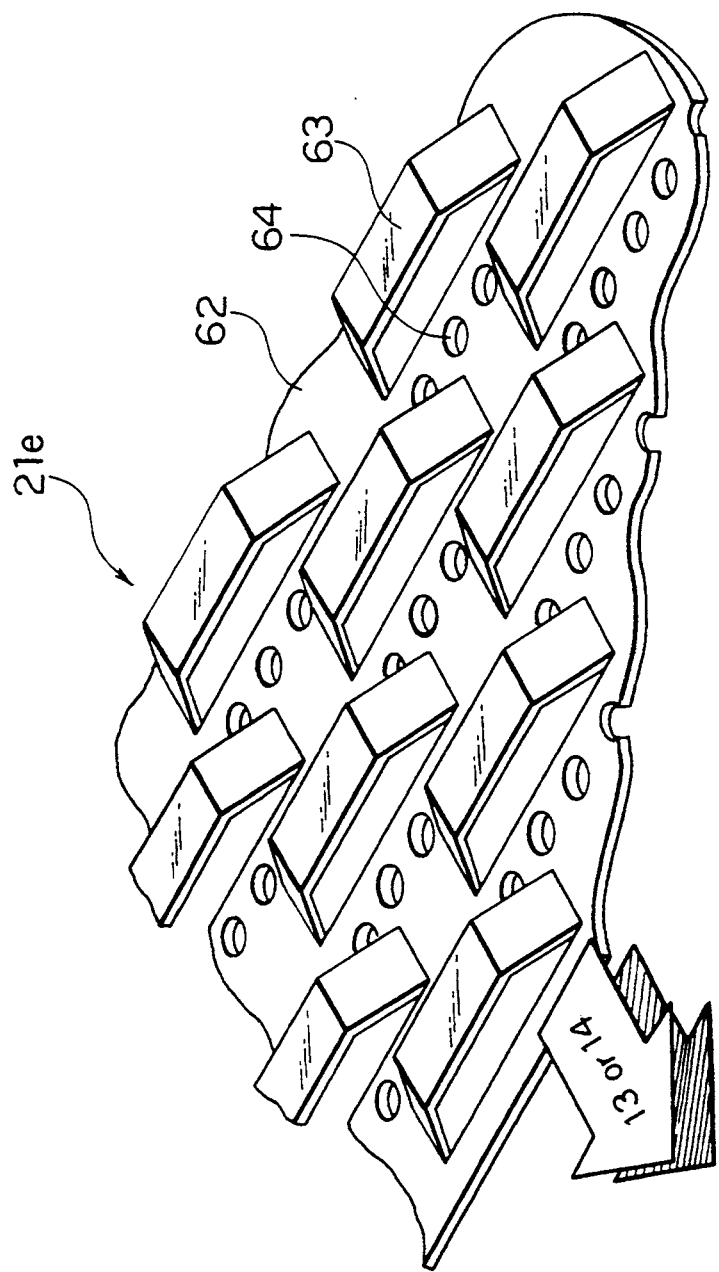
FIG. 16 is a view showing a construction of principal portions of an embodiment where a current collector and a current collector support are unifiedly constructed by the press working and the etch working.

FIG. 16 shows a construction of principal portions of a separator 21e of another embodiment. The separator 21e is characterized in that each current collector and each current collector support are unifiedly formed by the press working and that holes are made by the etch working. In other words, the anode current collector 62 shown in the figure has shields 63 made by the press working and a large number of small holes 64 made by the etch working. The shield 63 functions as an current collector support.

The above mentioned press working and the etch working can be independently performed in any order. When the shield 63 is formed from one thin plate, it should be machined. However, when the thin plate is machined, its deformation and the residual stress are accelerated. Thus, to minimize them, it is available to make the small holes 64 by the etch working, which can prevent the deformation and the residual stress from taking place, rather than the machine working. In addition, the small holes 64 can be also made on the shield 63.

As was described above, when the current collector and the current collector support are unifiedly constructed, it is possible to remove the electric resistance at their contacting portion. In addition, the output of the electricity of the fuel cell can be improved. Moreover, it is not necessary to consider the increase of the electric resistance due to corrosion of the contacting portion. Furthermore, by the unified construction, since the dimensional tolerance is not added, the dimensional control can be simplified.

Figure 17:
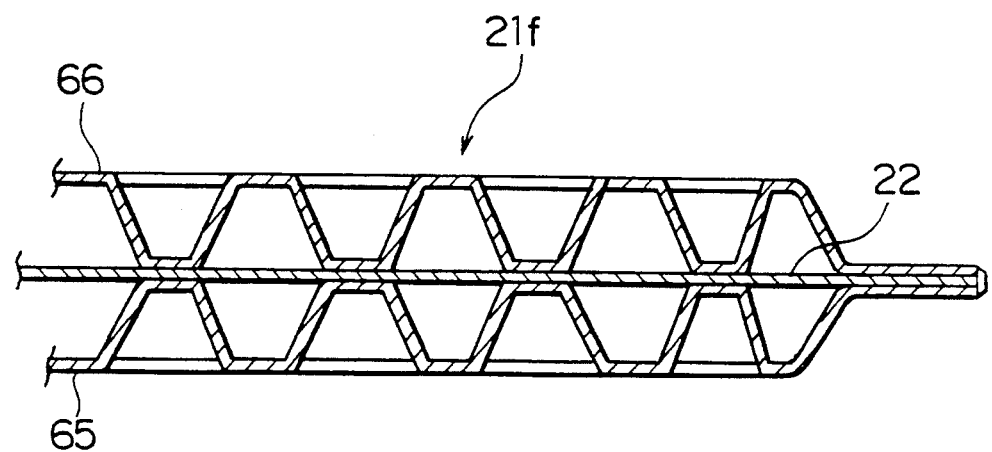
FIG. 17 is a view showing an entire construction of an embodiment where a current collector, a current collector support, and an edge plate are unified.

A separator 21f shown in FIG. 17 is characterized in that an anode current collector 65 and a cathode current collector 66 where an current collector, an current collector support and an edge plate are unifiedly formed are used. The constructions of the current collectors and the current collector supports are the same as those of the separator 21e shown in FIG. 16 except for the portions of the edge plates. In this case, since holes are made on the portion of the current collector support of the current collector, this portion also functions as a gas flow path. Thus, it is not necessary to form the small holes. In addition, it is possible to form the small holes on the shield portion or other portion. However, when the small holes are formed, it is preferable to form them by the etch working as was described above.

The separator 21f can prevent the increase of the electric resistance of the contacting portions due to corrosion. In addition, by the unified construction, the dimensional tolerance can be decreased and thereby the dimensional control can be simplified.

For the press working method, the above mentioned methods by using the female type die 32 and the male type die 37 shown respectively in FIGS. 4 and 5 can be used. Likewise, the distortion involved in the forming in the case where the female type die 32 is used can be more properly suppressed than that in the case where the male type die 37 is used. In addition, since each edge plate and each current collector are formed from one plate, a winkle does not tend to take place in the members. Thus, it is possible to decrease the electric contacting resistances between the anode current collector 65 and the active component 1 and between the cathode current collector 66 and the active component 1, thereby improving the output of the electricity of the fuel cell.

Figure 18:
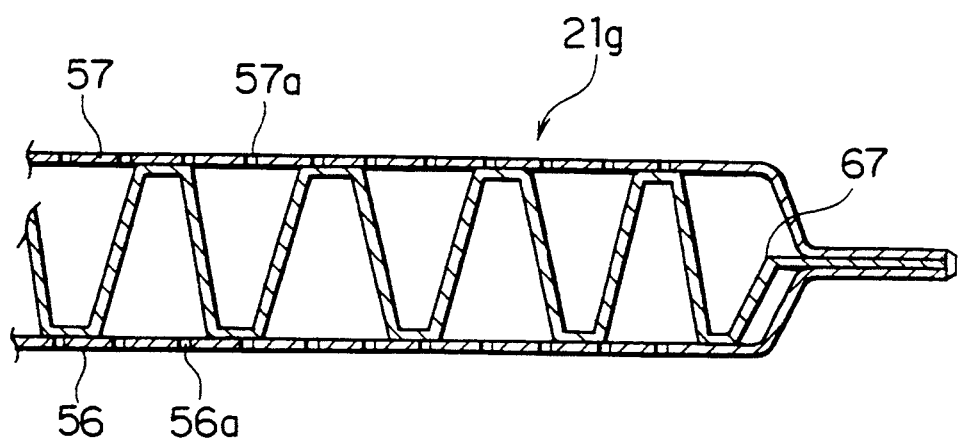
FIG. 18 is a view showing a construction of an embodiment where an interconnector and a current collector support are unified.

A separator 21g shown in FIG. 18 has a corrugated interconnector 67 where an anode current collector support, a cathode current collector support, and an interconnector are unifiedly formed from one thin plate. Although this separator 21g uses the anode current collector 56 and the cathode current collector 57, it is possible to use other current collectors.

As for the separator 21g thus constructed, by decreasing the contacting surfaces, the contacting electric resistance can be decreased. The increase of electric resistance due to corrosion can also be prevented. In addition, by unifiedly constructing the members, the dimensional tolerance can be decreased, thereby simplifying the dimensional control.

The interconnector 67 can be produced by a draw working of a press working.

Then, a seal welding method for welding the anode edge plate, the inter-connector, and the cathode edge plate will be described. The result of this unification working remarkably affects the finish accuracy of the separator.

Figure 19:
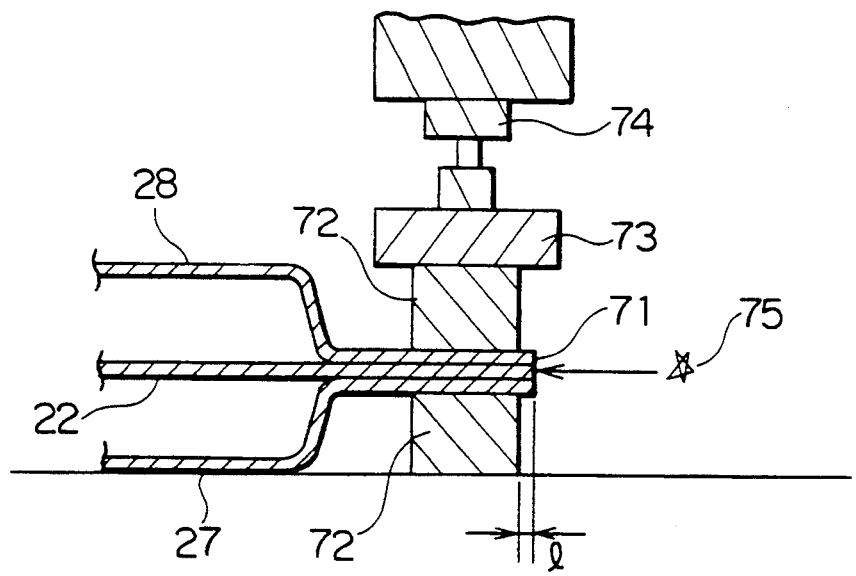
FIG. 19 is a view describing a welding method.

As shown in FIG. 19, edge plates, for example, the anode edge plate 27 (or another anode edge plate), the interconnector 22 (or another interconnector), and the cathode edge plate 28 (or another edge plate) are laminated so that their peripheral portions are almost fully matched. The vicinity of an edge connected portion 71 is nipped with heat sink metals 72. Thereafter, while the vicinity of the edge connected portion 71 is pressured with for example a hydraulic jack 74 through a restraining plate 73, the anode edge plate 27, the interconnector 22, and the cathode edge plate 28 are continuously welded along their outer peripheral portions by a welding heat source 75. In this manner, the deformation due to heat by the welding is prevented. As the welding heat source 75, any type which can be used in a conventional welding such as TIG (tungsten inert gas arc), plasma, electron beam, or laser can be used. The edge connected portion 71 to be welded is preferably formed from such three plates being uniformly laminated in terms of the workability and the quality. In addition, the length 1 of the portion extruded from the heat sink metals 72 is preferably in the range from 0 to 0.2 mm so as to minimize heat exposed thereto by the welding.

Figure 20:
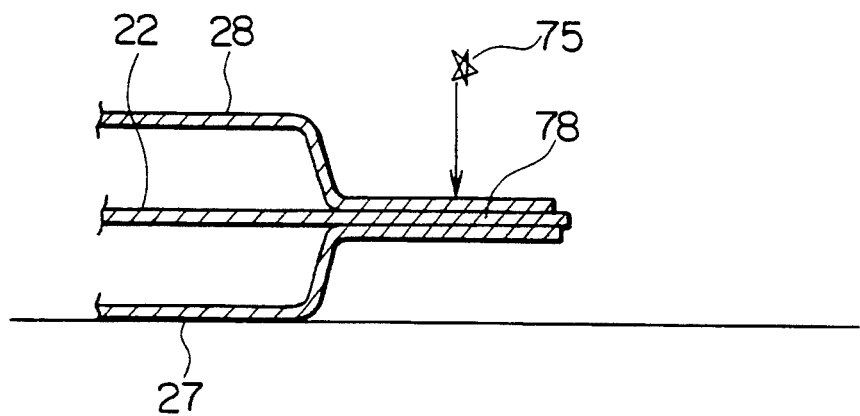
FIG. 20 is a view describing another welding method.

In addition, as shown in FIG. 20, by laminating the anode edge plate 27 (or another anode edge plate), the interconnector 22 (or another interconnector), and the cathode edge plate 28 (or another edge plate), any position of an outer contour portion 78 can be seam welded so as to unifiedly construct them. According to this method, since the anode edge plate 27, the interconnector plate 28, and the cathode edge plate 28 can be welded at any position of the outer contour portion 78 of the separator, it is not necessary to preliminary machine the edge connected portion thereof in the same dimensions. Thus, the separator can be readily produced.

Generally, a separator completely separates the fuel gas from the oxidant gas and passes them to the anode and the cathode, respectively. The anode and the cathode are directly and intimately contacted with the separator. Usually by the physical contact or by the presence of electrolyte soaked in the anode and the cathode, the separator seals in the gases on the surface faced an active component. However, it is very difficult to completely keep the gases sealed in. In other words, the fuel gas and the oxidant gas unavoidably leak out of the separator. In addition, an external gas unavoidably mixes with the fuel gas and the oxidant gas.

Then, a separator which can prevent the fuel gas or the oxidant gas from leaking out of the separator will be described in the following.

Figure 21:
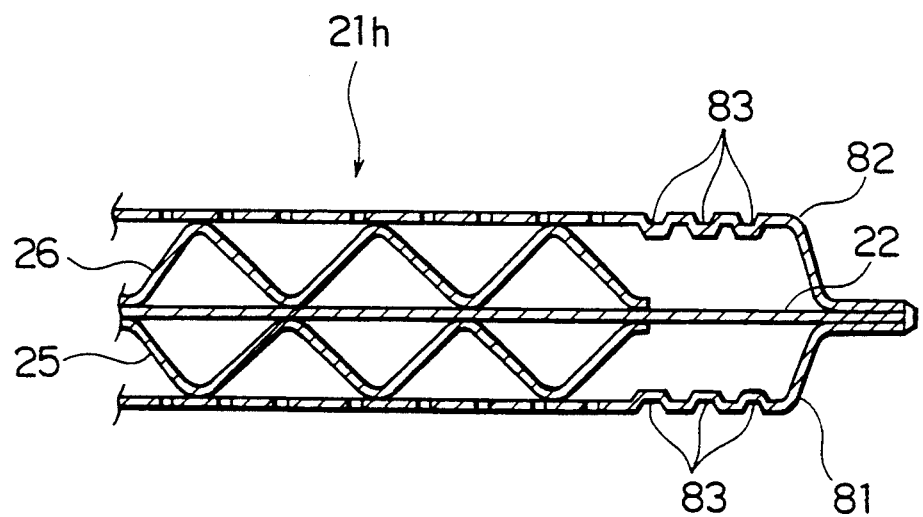
FIG. 21 is a view showing a construction of an embodiment where grooves are provided.

FIG. 21 shows a construction of a separator 21h of an embodiment which was designed to satisfy the above mentioned object. In this embodiment, each of an anode edge portion 81 and a cathode edge portion 82 have grooves 83 on the surface in contact with the active component. The groove 83 is filled with for example glass powder as a sealing material. The glass powder constantly resides in the groove 83 so as to prevent the fuel gas and the oxidant gas from flowing out of the separator or an external gas from entering therein.

Although powder, for example glass powder or fiber material, as the sealing material tends to be lost by the pressure difference of the gases and outer disturbances. However, according to the present embodiment, since the groove 83 prevents the sealing material from moving and constantly holds it between the separator 21h and the active component 1, it is possible to prevent the fuel gas and the oxidant gas from leaking out of the separator 21h. In addition, when members of the separator are unified by the weld working, this groove 91 can also prevent the surfaces of the anode edge portion 81 and the cathode edge portion 82 in contact with the active component 1 from being distorted by heat applied thereby.

Figure 22:
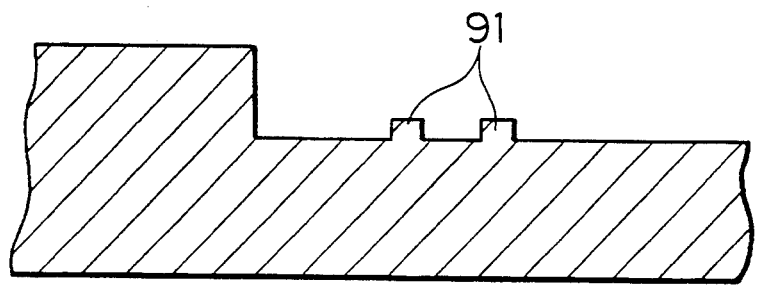
FIG. 22 is a view showing a construction of a female die for use in the press working of an edge plate with grooves.

FIG. 22 shows a construction of principal portions of a die in use for a press working for forming the groove 83. This die is constructed such that an extruded portion 91 for forming grooves is formed on the female type die 32 shown in FIG. 4. By using this die in the above mentioned method, while the anode edge portion 81 and the cathode edge portion 82 are drawn, the grooves 91 are formed. Since each of the anode edge portion 81 and the cathode edge portion 82 have the grooves 91, the distortion and deformation which are intrinsic to thin plates can be minimized. Thus, the flatness of the portions where the anode edge portion 81 and the cathode edge portion 82 contact with the active component 1 can be kept high, thereby improving the performance of the fuel cell being laminated.

Generally, an extruded member is provided in the separator. The extruded member diffuses the flow so as to decrease the mass-transfer resistance of the reaction gas supplied to the surface of the active component 1 and to improve heat transfer coefficient. Normally, this member also functions as an current collector support. With respect to the above mentioned separators, for example, the separator 21, the flow width of the separator 21 including the anode current collector support 25 and the cathode current collector support 26 is larger than that of the reaction areas of the anode 3 and the cathode 4. Thus, part of the fuel gas or the oxidant gas which are supplied do not contribute to the reaction, but get exhausted by running off both outside of the reaction surface.

In particular, when the current collector support is provided only at part of the reaction surface and there is no filling member in the vicinity of the current collector support, the fuel gas and the oxidant gas preferentially flows in the vicinity of the current collector support where the flow resistance is small. In addition, with respect to the separator 21d shown in FIG. 15, which is provided with each current collector support in the entire inside thereof, the fuel gas and the oxidant gas easily flow to the non-reaction portion which is free of disturbance. Thus, the ratio of the fuel gas and the oxidant gas which do not arrive at the reaction surface may become large. Such a bypass effect causes part of the fuel gas and the oxidant gas not to contribute to the reaction, thereby decreasing the system efficiency of the fuel cell.

Thus, it is preferable to narrow the flow path where the fuel gas and the oxidant gas flow so that they flow along the reaction surface as much as possible, thereby preventing the fuel gas and the oxidant gas from wastfully flowing and increasing the ratio of the fuel gas and the oxidant gas being supplied on the reaction surface to those gases not being supplied.

Then, with reference to FIGS. 23 and 24, a separator 21i which was designed in accordance with the above mentioned object will be described.

Figure 23:
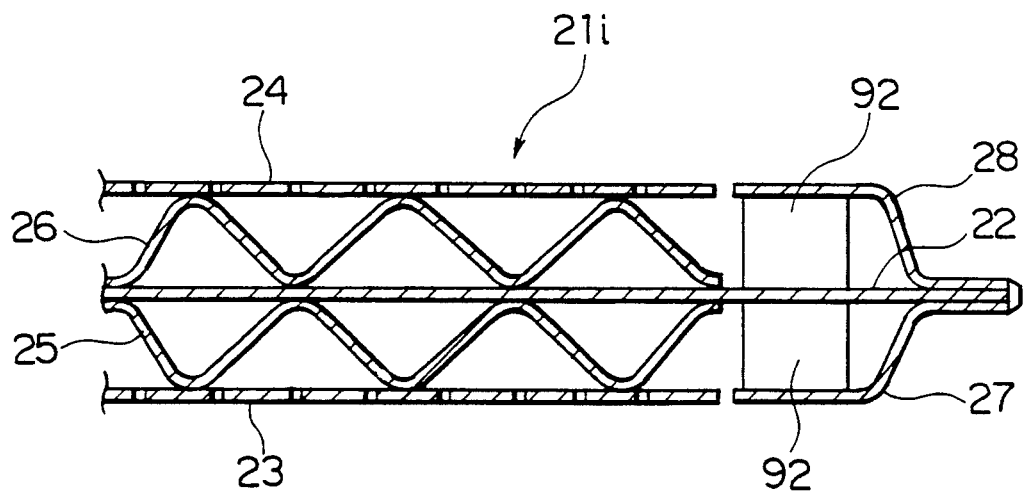
FIG. 23 is a view showing a construction of an embodiment where a filling member is provided.
Figure 24:
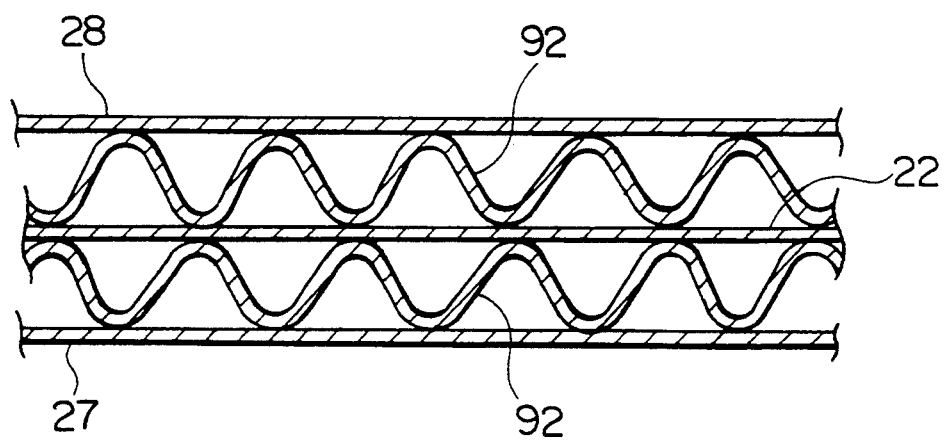
FIG. 24 is a view showing a construction of the filling member.
Figure 25:
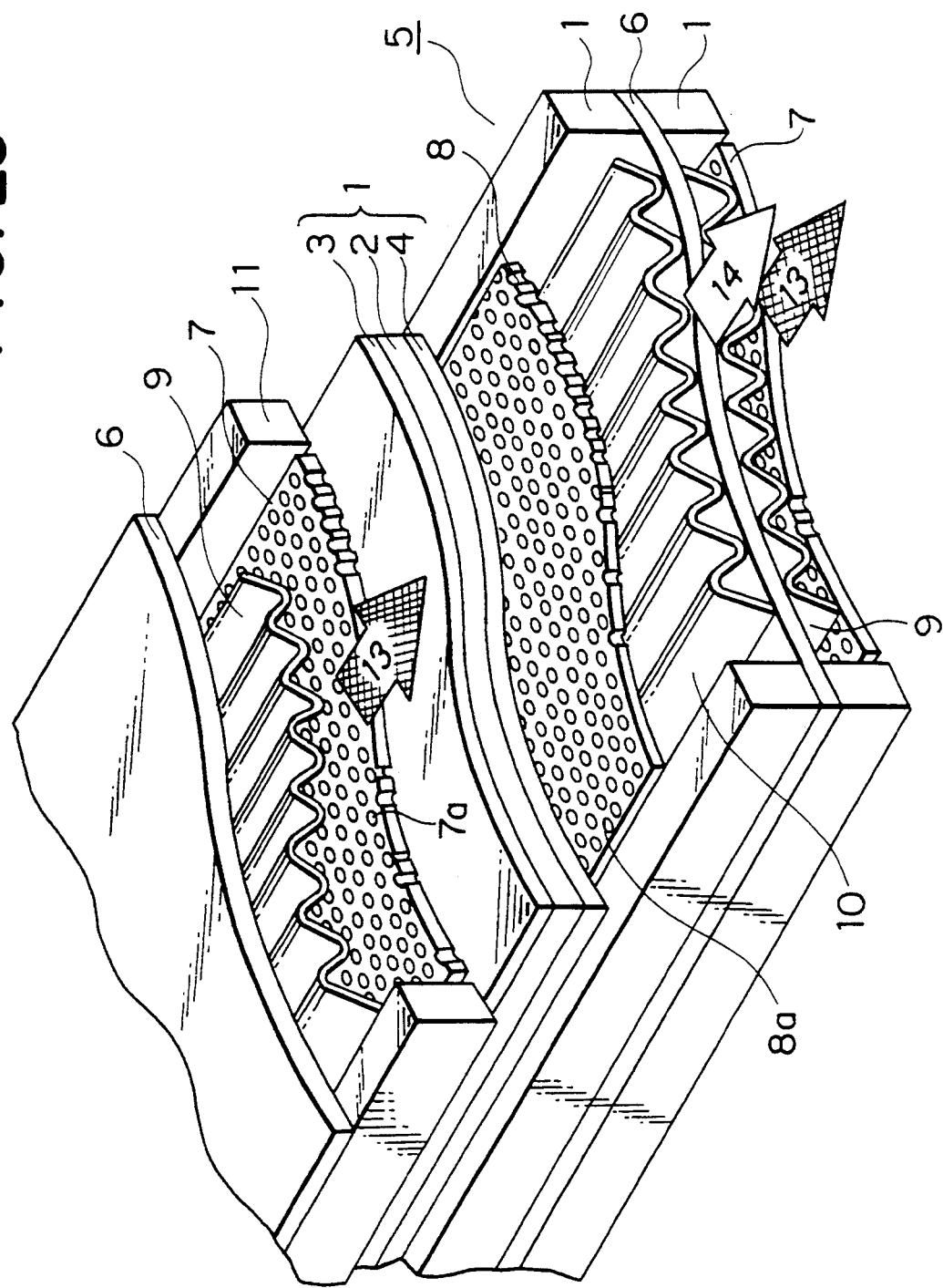
FIG. 25 is a view showing a construction of a conventional separator.
Figure 26:
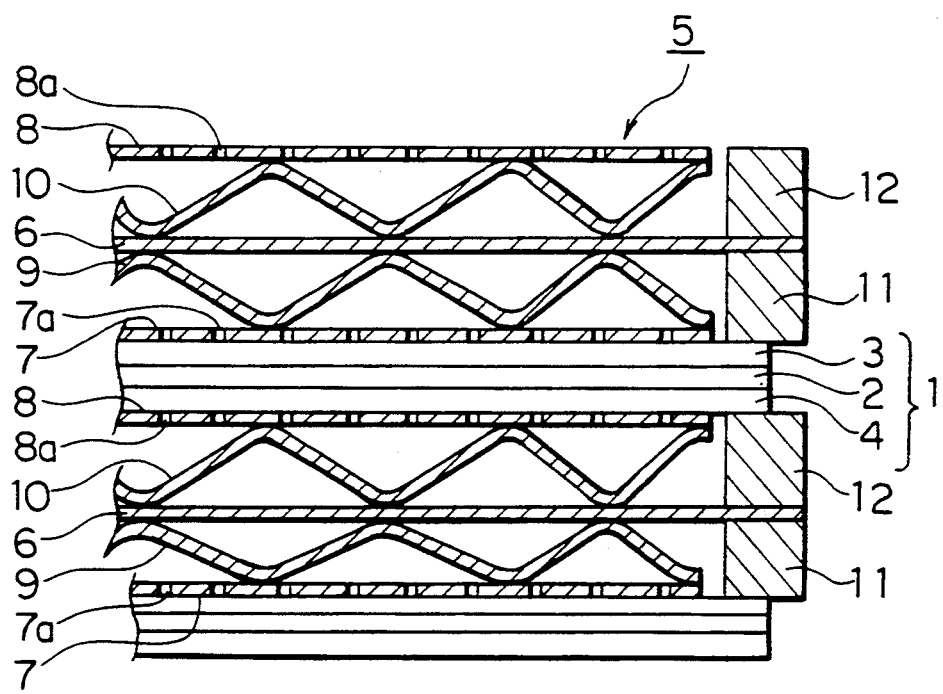
FIG. 26 is a view showing a construction of the separator shown in FIG. 25.
Figure 27:
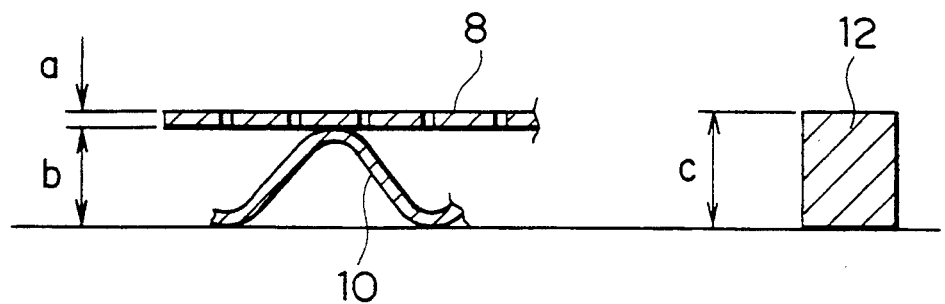
FIG. 27 is a view describing a gap which takes place in the direction of the height of the conventional separator.

As shown in FIG. 23, at parts of the anode edge plate 27 and the cathode edge plate 28 in the separator 21i, filling members 92 are disposed. As shown in FIG. 24, the filling member 92 is corrugated. The filling member 92 is disposed so that the direction of ridge thereof is perpendicular or nearly perpendicular to the direction of flow of the fuel gas or the oxidant gas. The filling member 92 is filled in the entire or part of the area except for the reaction portion.

When the height of the filling member 92 is the same as those of the anode current collector support 25 and the cathode current collector support 26, a higher effect can be obtained. The pitches of the uneven corrugated portion is preferably small. Moreover, instead of the corrugated filling member, it is possible to use a metal wool, ceramic wool, or the like.

When the separator 21i is used, the filling member 92 can increase the ratio of the fuel gas and the oxidant gas flowing on the reaction surface to those gases not flowing on the surface, thereby improving the system efficiency of the fuel cell.

INDUSTRIAL UTILIZATION

As was described above, the separators and the method of manufacturing the same according to the present invention are suitable for separators of power generating fuel cells and, in particular, of molten carbonate fuel cells.

We claim:

1. A method of manufacturing a separator disposed between laminates of single cells having a fuel electrode, an electrolyte layer, and an air electrode for leading a fuel gas and an oxidant gas to said fuel electrode and said air electrode through different flow paths, respectively, for forming current collectors and edge plates in contact with said fuel electrode and said air electrode, said method comprising the steps of:
  placing a die and an outer frame for surrounding of the die on a press head;

placing a thin plate on said die and then a soft plate thereon; and pressing directly said soft plate and thereby said thin plate is formed into a given shape.

2. The method of manufacturing the separator as set forth in claim 1, characterized in that a total of three plates consisting of an interconnector for separating said different flow paths and said edge plates are laminated and the outer contour portion thereof is jointed by a seal weld working.

3. The method of manufacturing the separator as set forth in claim 1 or 2, characterized in that said current collector is etched by an etch working to make small holes.

4. The method of manufacturing the separator as set forth in claim 1, characterized in that said die is a female type die.

5. The method of manufacturing the separator as set forth in claim 1, characterized in that said die is a male type die.

* * * * *